United States Patent
Lehtinen

(10) Patent No.: US 7,069,021 B2
(45) Date of Patent: Jun. 27, 2006

(54) METHOD AND A SYSTEM FOR POSITIONING OF AN ELECTRONIC DEVICE, AND AN ELECTRONIC DEVICE

(75) Inventor: Antti Lehtinen, Tampere (FI)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/373,437

(22) Filed: Feb. 25, 2003

(65) Prior Publication Data

US 2003/0162552 A1    Aug. 28, 2003

(30) Foreign Application Priority Data

Feb. 25, 2002    (FI) .................................. 20020359

(51) Int. Cl.
  *H04Q 7/20*    (2006.01)
(52) U.S. Cl. .................. 455/456.1; 455/12.1; 455/427; 701/213; 701/214; 701/226; 367/90; 367/94; 342/357.1; 342/357.06
(58) Field of Classification Search ............. 455/12.1, 455/414.2, 427, 456.1; 701/213, 214, 226; 367/90, 94; 342/357.1, 357.12, 357.15, 357.16, 342/357.17, 357.06

See application file for complete search history.

(56) References Cited

U.S. PATENT DOCUMENTS

| 5,444,450 | A | * | 8/1995 | Olds et al. ............. 342/357.02 |
| 5,610,615 | A | * | 3/1997 | Chiodini ................. 342/357.17 |
| 5,798,732 | A | * | 8/1998 | Eshenbach ............. 342/357.12 |
| 5,943,606 | A | * | 8/1999 | Kremm et al. ............. 455/12.1 |
| 5,955,986 | A | | 9/1999 | Sullivan |
| 5,969,669 | A | | 10/1999 | Ishikawa et al. |
| 6,020,847 | A | * | 2/2000 | Upton et al. ............ 342/357.16 |
| 6,122,506 | A | * | 9/2000 | Lau et al. .................... 455/427 |
| 6,225,945 | B1 | * | 5/2001 | Loomis .................. 342/357.12 |
| 6,243,648 | B1 | * | 6/2001 | Kilfeather et al. .......... 701/213 |
| 6,331,836 | B1 | * | 12/2001 | Jandrell ................. 342/357.12 |
| 6,407,699 | B1 | * | 6/2002 | Yang ..................... 342/357.12 |
| 6,778,136 | B1 | * | 8/2004 | Gronemeyer .......... 342/357.15 |

FOREIGN PATENT DOCUMENTS

EP    0803742    10/1997
EP    1033582    9/2000

* cited by examiner

*Primary Examiner*—Steve M. D'Agosta
(74) *Attorney, Agent, or Firm*—Ware, Fressola, Van Der Sluys & Adolphson LLP

(57) ABSTRACT

A method is provided for determining the position of an electronic device by receiving a code modulated signal transmitted by satellites, and position information of the satellites and time data, and by generating local time data. In the method, delta range measurements are taken for at least four different satellites. For each of said at least four satellites, the velocity of the satellite is determined in relation to the positioning receiver. Furthermore, in the method, the delta range measurement results are replaced in an algorithm applying said delta range measurements and velocities to generate reference data for determining the local time data frequency error and the position. The local time data frequency error and the position are determined by searching for the minimum value of said reference data. A system and an electronic device applying the method are also provided.

19 Claims, 3 Drawing Sheets

METHOD AND A SYSTEM FOR POSITIONING OF AN ELECTRONIC DEVICE, AND AN ELECTRONIC DEVICE

CROSS-REFERENCE TO RELATED APPLICATIONS

This application claims priority under 35 USC § 119 to Finnish Patent Application No. 20020359 filed on Feb. 25, 2002.

FIELD OF THE INVENTION

The present invention relates to a method for positioning of an electronic device by receiving a code modulated signal transmitted by satellites, satellite position information and time data, and by generating local time data. The invention also relates to a system with receiving means for receiving code-modulated signals transmitted by satellites, means for receiving satellite position information and time data, and means for generating local time data. Furthermore, the invention relates to an electronic device with means for receiving code-modulated signals transmitted by satellites, means for receiving satellite position information and time data, and means for generating local time data.

BACKGROUND OF THE INVENTION

In positioning systems based on satellite positioning, a positioning receiver attempts to receive signals from at least four satellites in order to determine the position of the positioning receiver as well as the time data. An example of such a satellite positioning system is the GPS system (Global Positioning System), comprising a plurality of satellites orbiting the globe according to predetermined orbits. These satellites transmit Ephemeris data, on the basis of which the position of a satellite can be determined at each moment of time, in case the exact time data used in the satellite positioning system is known in the positioning receiver. In the GPS system, the satellites transmit a spread spectrum signal modulated with a code which is individual for each satellite. Thus, the positioning receiver can distinguish signals transmitted by different satellites from each other by using a reference code corresponding to a satellite code generated locally in the positioning receiver.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo sequence. This pseudo sequence is different for each satellite. As a result of the modulation, a code-modulated wide-band signal is generated. The modulation technique used in the receiver makes it possible to distinguish between the signals transmitted by different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

To detect the signals of the satellites and to identify the satellites, the receiver performs acquisition, whereby the receiver searches for the signal of one satellite at a time and attempts to be synchronized and locked to this signal so that the information transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. In portable devices, the aim is also to reduce the power consumption to a minimum. Thus, for example, a positioning receiver arranged in connection with a wireless communication device is not necessarily kept in operation all the time, but primarily when there is a need to perform positioning. This causes, e.g., the problem that the time taken for the positioning is relatively long, because the positioning receiver must first perform acquisition, after which it starts to receive navigation information either from the satellite signal or, e.g., from a base station in a mobile communication network. The positioning receiver can perform the positioning first after it has received a sufficient quantity of navigation information. Further-more, the positioning receiver must take pseudo range measurements which, in receivers of prior art, are started after receiving at least the satellite Ephemeris parameters of the navigation information. This will prolong the time taken from the turning on of the positioning receiver to the completion of the first position-time fix.

The distances between the positioning receiver and the satellites are called pseudo ranges, because the time is not accurately known in the positioning receiver. Thus, the determinations of position and time are iterated until a sufficient accuracy is achieved with respect to time and position. Because the time is not known with absolute precision, the position and the time must be determined e.g. by linearizing a set of equations for each new iteration.

The calculation of pseudo range can be performed, for example, by measuring the code phases of the satellite signals in the receiver.

The above-mentioned acquisition and frequency control process must be performed for each satellite signal received in the receiver. Some receivers may have several receiving channels, wherein an attempt is made on each receiving channel to acquire the signal of one satellite at a time and to find out the information transmitted by this satellite.

The positioning receiver receives information transmitted by satellites and performs positioning on the basis of the received information. In order to perform positioning, the receiver must receive a signal transmitted by at least four different satellites to detect the x, y, z coordinates and the time data. The received navigation information is stored in a memory, wherein this stored information can be used to detect e.g. the Ephemeris data of satellites.

It may be impossible to maintain the acquisition in situations in which the signal is attenuated. In such a situation, the positioning receiver may not necessarily be capable of measuring pseudo ranges either, so that positioning cannot be performed in receivers of prior art.

SUMMARY OF THE INVENTION

It is an aim of the present invention to provide an improved method for positioning, particularly under weak signal conditions, as well as a system and a positioning receiver applying the method. The invention is based on the idea that the positioning receiver measures changes in the Doppler frequency to determine the change in the satellite velocity in relation to the positioning receiver. These velocity measurements are also called delta range measurements in this specification. This delta range corresponds to the derivative of the pseudo range in relation to time, i.e. the change of the pseudo range in a time unit. In the method, reference data is formed on the basis of delta range measurements and velocities to determine the local time data frequency error and position. For a method according to an advantageous embodiment of the invention, an algorithm has been developed, in which the delta range measurement results obtained from at least four different satellites are used to find a minimum of this algorithm. The minimum indicates thus the position estimate. To put it more precisely, the method according to the present invention is primarily characterized in taking delta range measurements for at least four different satellites, determining the satellite velocity in relation to the electronic device for each of said at least four satellites, using said delta range measurements and velocities to generate reference data for determining the local time data frequency error and the position of the electronic device, and searching for the minimum value of said reference data. The positioning system according to the invention is primarily characterized in that it comprises means for taking delta range measurements to at least four different satellites, means for determining the velocity of each of said at least four satellites in relation to the receiving means, means for using said delta range measurements and velocities to generate reference data for determining local time data frequency error and position, and means for searching for the minimum value of said reference data. Furthermore, the electronic device according to the invention is primarily characterized in that it comprises means for taking delta range measurements to at least four different satellites, means for determining the velocity of each of said at least four satellites in relation to the electronic device, means for using said delta range measurements and velocities to generate reference data for determining local time data frequency error and the position of the electronic device, and means for searching for the minimum value of said reference data.

The present invention shows remarkable advantages over solutions of prior art. In the method according to the invention, it is possible to determine delta range values from even a relatively weak signal; therefore, the positioning can be performed also in a situation in which positioning receivers of prior art, which are based on the measurement of pseudo ranges, are not capable of performing the positioning. In the method according to the invention, there is no need to determine navigation information included in the signal to be received, which is necessary in methods of prior art, based on the measurement of pseudo ranges. When applying the method of the invention, the initial value used for the position of the positioning receiver may be considerably inaccurate, with an error of even several thousands of kilometres, and the position of the positioning receiver can still be found out at an accuracy as good as even about a hundred metres. Furthermore, the method according to the invention can be used in connection with other systems, to generate a relatively accurate initial guess for the position of the positioning receiver. In this way, it is possible to accelerate the accurate positioning. Furthermore, in the method of the invention, the positioning receiver only needs to be connected to one station transmitting position information, such as the base station of a mobile communication network. However, in positioning methods of prior art, which are based on base stations, a connection must be set up to at least three different base stations.

DESCRIPTION OF THE DRAWINGS

In the following, the invention will be described in more detail with reference to the appended drawings, in which.

DETAILED DESCRIPTION OF THE INVENTION

Figure 1:
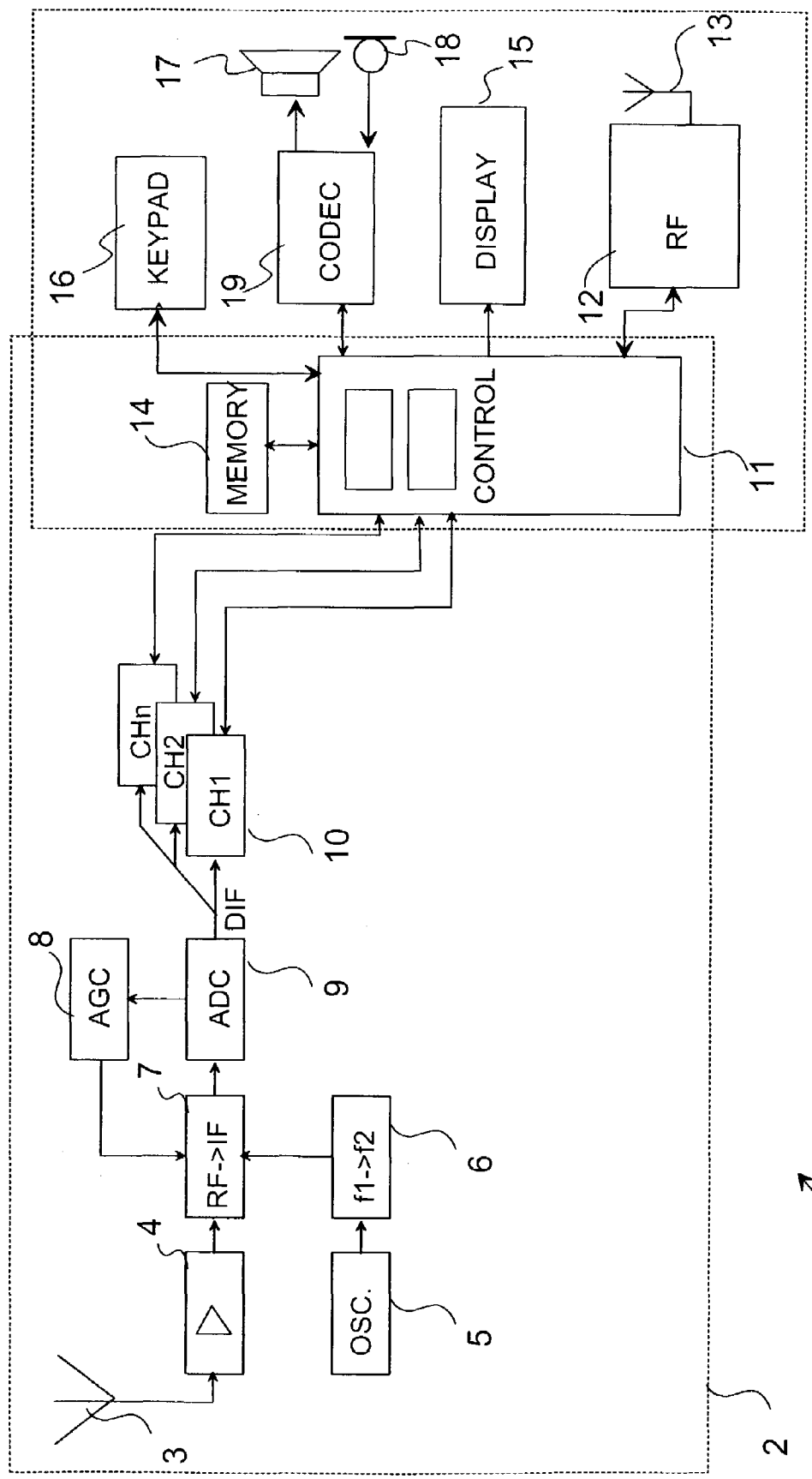
FIG. 1 shows a positioning receiver according to a preferred embodiment of the invention in a reduced block chart.

In the following detailed description of the invention, the positioning system will be exemplified with the GPS system, but it will be obvious that the invention is not limited to this system only.

Next, we shall derive the algorithm to be applied in the method according to the invention. The frequency of the signal to be received in the positioning is not always the same as the frequency of the signal at the moment of transmission. This is primarily due to the fact that the satellite is moving in relation to the positioning receiver. Thus, when the satellite is approximating the positioning receiver, the frequency of the signal is higher than the transmission frequency, and when the satellite is moving farther away from the positioning receiver, the frequency of the signal is lower than the transmission frequency. This phenomenon and the frequency shift are called the Doppler effect and the Doppler shift, respectively. This Doppler shift $D_i$ can be modelled by means of a dot product in the following way:

$$D_i = -\left(\frac{w_i - w_u}{c} \cdot \frac{r_i - r_u}{\|r_i - r_u\|}\right) L_1 \quad (1)$$

in which $w_i$ is the velocity vector of the satellite $SV_i$, $w_u$ is the velocity vector of the positioning receiver, c is the speed of light, $r_i$ is the position vector of the satellite $SV_i$, $r_u$ is the position vector of the positioning receiver, and $L_1$ is the frequency of the signal from the satellite at the moment of transmission.

The above formula for the Doppler shift $D_i$ can be modified to achieve a range rate equation. For notational simplicity, the relative velocity $v_i$ of the satellite is defined as follows:

$$v_i = w_i - w_u \quad (2)$$

By substituting the formula (2) in the formula (1), the following equation is obtained:

$$v_i \cdot \frac{r_u - r_i}{\|r_u - r_i\|} = \frac{D_i c}{L_1} \quad (3)$$

From the formula (3), we notice that the left hand side of the equation denotes the rate at which the satellite $SV_i$ is approaching the positioning receiver 2. Consequently, it is a projection of the velocity vector of the satellite $SV_i$ on the direction vector of unit length between the satellite $SV_i$ and the positioning receiver 2. This formula (3) can also be presented as a range rate equation, resulting in formula (4):

$$-\frac{d}{dt}\|r_u - r_i\| = \frac{D_i c}{L_1} \quad (4)$$

Let us now assume that the current time, the velocity of the positioning receiver 2 as well as Ephemeris data of the satellite $SV_i$ are known. It is thus possible to calculate the satellite position vector $r_i$ as well as the relative velocity $v_i$. Furthermore, the speed of light c, the true transmitted frequency $L_1$ and the true Doppler shift $D_i$ are also assumed to be known. Thus, with the preceding assumptions, the only unknown variable in the formula (3) is the position vector $r_i$ of the positioning receiver.

It can be stated that the vector $$\frac{r_u - r_i}{\|r_u - r_i\|}$$

is of unit length; consequently, its length is 1. Thus, the dot product of the formula (3) can also be presented in another form, by means of the dot product definition $a \cdot b = \|a\| \cdot \|b\| \cdot \cos \angle(a,b)$. By substituting the values $a = v_i$, $$b = \frac{r_u - r_i}{\|r_u - r_i\|}$$

and $\angle(a,b) = \alpha$ in this definition, we obtain:

$$\|v_i\| \cdot \cos \alpha = \frac{D_i c}{L_1} \quad (5)$$

in which $\alpha = \angle(v_i, r_u - r_i)$ is the angle between the relative velocity $v_i$ of the satellite $SV_i$ and the direction vector $r_u - r_i$ of unit length between the satellite $SV_i$ and the positioning receiver 2. When the angle $\alpha$ is solved in the equation (5), the following equation is obtained:

$$\alpha = \arccos\left(\frac{D_i c}{L_1 \|v_i\|}\right) \quad (6)$$

Figure 3:
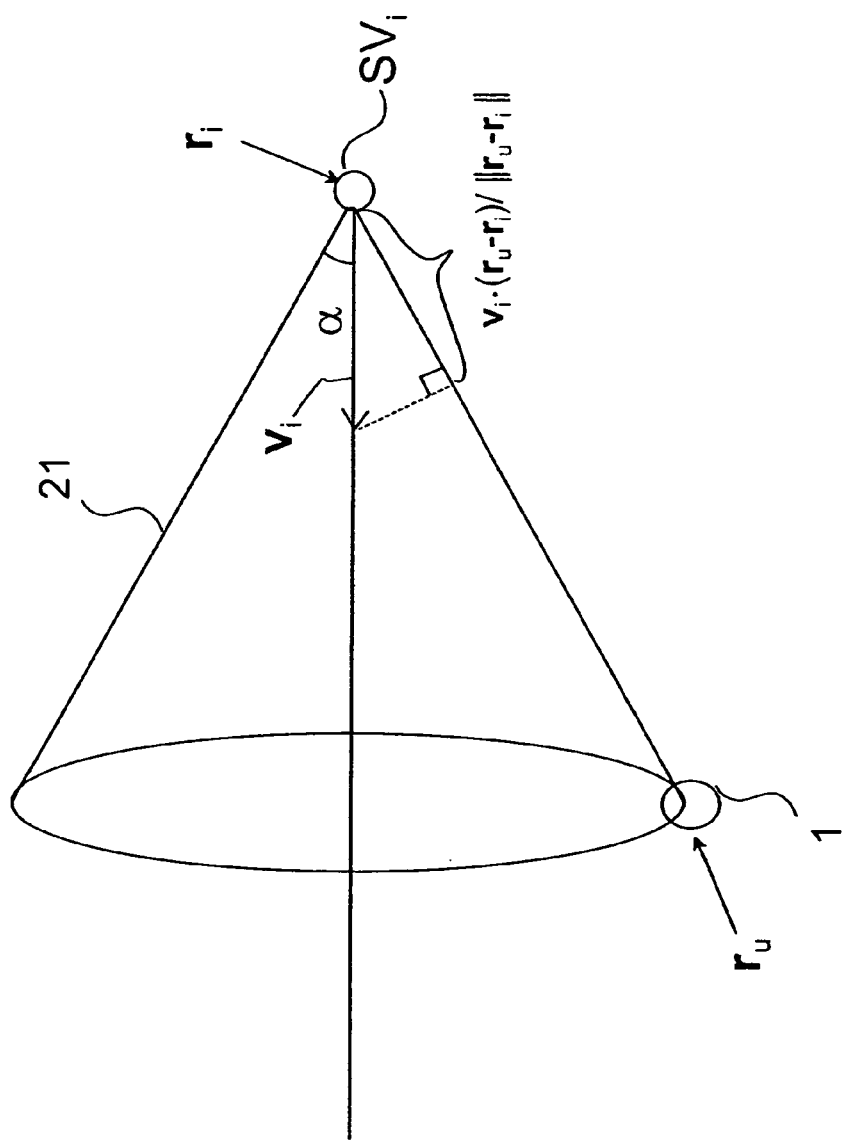
FIG. 3 shows, in a principle view, the Doppler effect in a satellite positioning system and illustrates geometric quantities used in a preferred embodiment of the invention.

Consequently, the positioning receiver must be located so that the direction vector $r_u - r_i$ of unit length between the satellite $SV_i$ and the positioning receiver 2 forms the angle $\alpha$ with the relative velocity $v_i$ of the satellite $SV_i$. Thus, possible positions form a surface on a circular cone 21 (FIG. 3), whose vertex is at the position of the satellite $SV_i$. The central axis of such a circular cone extends, in theory, to infinity in the other direction. The direction of this central axis is the same as the direction of movement $v_i$ of the satellite at a point $r_i$ when the Doppler shift is positive, and correspondingly, the direction of the central axis is opposite to the direction of the movement $v_i$ of the satellite at the point $r_i$ when the Doppler shift is negative. The angle between the central axis of the circular cone and the surface meets the formula (6); consequently, $$\alpha = \arccos\left(\frac{D_i c}{L_1 \|v_i\|}\right).$$

In the special case in which the Doppler shift equals zero, the positioning receiver is located on a plane which extends through the position of the satellite $SV_i$ and is orthogonal to the direction of movement $v_i$ of the satellite $SV_i$.

If there are three Doppler measurements available, it is possible to solve the three unknown variables which are the coordinates of the position of the positioning receiver, i.e. the position vector $$r_u = \begin{bmatrix} x_u \\ y_u \\ z_u \end{bmatrix}.$$

The position to be found is thus at the intersection of the three different circular cones defined by the formula (3). Thus, at least three different satellites must be used to have said three Doppler measurements available. However, the above-presented assumptions do not normally hold true in practical situations. In the positioning receiver, it is extremely difficult to measure the Doppler shift with the precision required for the positioning.

In order to accurately measure the frequency of a signal, a very accurate and stable clock generator must be used. The same applies also to accurately generating a desired frequency. In satellites of the GPS system, highly accurate atom clocks are used, whose working accuracy is controlled at earth stations. If necessary, the time data of the satellite clocks can be adjusted on the basis of measurements taken by these earth stations. Consequently, the frequency of the signal transmitted by the satellites is very close to the correct one, so that it will not cause a significant bias in the positioning. In conventional commercial positioning receivers, however, it is not possible to use such atom clocks, e.g. for the reason that they are extremely valuable and require relatively even ambient conditions to secure reliable operation. In the positioning receiver, it is thus not necessarily possible to accurately determine the Doppler shift of the signal to be received. Let us indicate this receiver clock drift, i.e. the frequency error, with the reference $t_u$. If the frequency error $t_u$ is positive, it means that the clock of the positioning receiver is running fast and, correspondingly, if the frequency error $t_u$ is negative, the clock of the positioning receiver is running slow. The frequency error caused by the error $t_u$ in the measurement of the frequency of the signal to be received can be indicated as follows:

$$\Delta f = -\dot{t}_u L_1 \quad (7)$$

In this formula (7), we can notice, for example, that the error in the measurement of the frequency of the signal to be received in the positioning receiver is independent of the received frequency. Moreover, we can notice that the error is constant in the sense that it has the same value for all signals, if the measurements are made at the same time instant. However, the frequency error does not generally remain constant but will change in time.

In the following, we shall denote the frequency estimate measured by the positioning receiver for the signal transmitted from the satellite $SV_i$ and received at the positioning receiver, with the reference $f_i$. This can be placed in the formula (1) which was used to model the Doppler shift. Thus, the following expression is obtained:

$$f_i - L_1 = D_i + \Delta f + \varepsilon_{f_i} = \left(\frac{v_i}{c} \cdot \frac{r_i - r_u}{\|r_i - r_u\|}\right) L_1 - \dot{t}_u L_1 + \varepsilon_{f_i} \quad (8)$$

in which $\varepsilon_{f_i}$ models the noise effective on the frequency measurement. By definition, the delta range measurement has the format $$\dot{\rho}_i = \frac{f_i - L_1}{L_1} c \quad (9)$$

Combining the formulas (8) and (9) and defining the noise effective on the delta range measurement to be $$\varepsilon_{\dot{\rho}_i} = \frac{\varepsilon_{f_i} c}{L_1},$$

the following physical definition is obtained for the delta range:

$$\dot{\rho}_i = v_i \cdot \frac{r_i - r_u}{\|r_i - r_u\|} + c\dot{t}_u + \varepsilon_{\dot{\rho}_i} \quad (10)$$

For notational simplicity, we shall indicate the effect of the frequency error of the positioning receiver on the delta range measurement $c\dot{t}_u$ with a variable d. The unit of this variable d is the unit of velocity m/s. Disregarding the measuring error $\varepsilon_{\dot{\rho}_i}$ in the formula (10), the expression for the true delta range results in:

$$\dot{\rho}_{Ti} = v_i \cdot \frac{r_i - r_u}{\|r_i - r_u\|} + d \quad (11)$$

Now, the true delta range $\dot{\rho}_{Ti}$ can be approximated with the measured delta range $\dot{\rho}_i$. Using the equation (11), it is possible to form the following equation which contains four unknown variables, namely the coordinates $r_u \in R^3$ and the frequency error $d \in R$:

$$v_i \cdot \frac{r_i - r_u}{\|r_i - r_u\|} + d - \dot{\rho}_i = 0 \quad (12)$$

Let us now assume that there are n substantially simultaneous delta range measurements available. From each measurement, it is possible to form an equation similar to the formula (12), wherein all the measurements yield the system of n equations:

$$\begin{cases} v_1 \cdot \frac{r_1 - r_u}{\|r_1 - r_u\|} + d - \dot{\rho}_1 = 0 \\ v_2 \cdot \frac{r_2 - r_u}{\|r_2 - r_u\|} + d - \dot{\rho}_2 = 0 \\ \vdots \\ v_n \cdot \frac{r_n - r_u}{\|r_n - r_u\|} + d - \dot{\rho}_n = 0 \end{cases} \quad (13)$$

in which $v_i$, i=1 ... n are the relative velocity vectors of the satellites $SV_i$, assumed to be known, $r_i$, i=1 ... n are the position vectors of the satellites $SV_i$, assumed to be known, $\dot{\rho}_i$, i=1 ... n are the delta range measurements, assumed to be known, $r_u$ is the position vector of the positioning receiver, which is unknown, and d is the unknown receiver clock drift effect on the delta range measurements.

Consequently, the formula (12) contains four unknown factors $x_u$, $y_u$, $z_u$, and d. This equation (13) will now be used in the method according to the present invention as the basic equation for positioning based on the Doppler determinations, which will be developed further to the actual function to be used in the positioning calculation.

To simplify the denotations further, we shall now define a vector x which corresponds to the position and frequency error of the positioning receiver.

$$x = \begin{bmatrix} r_u \\ d \end{bmatrix} = \begin{bmatrix} x_u \\ y_u \\ z_u \\ d \end{bmatrix} \in R^4 \quad (14)$$

Furthermore, we will define a vector for the delta range measurement $$\dot{\rho} = [\dot{\rho}_1 \dot{\rho}_2 \ldots \dot{\rho}_n]^T \quad (15)$$

which is composed of n delta ranges measured from the signals of the satellite $SV_i$.

Consequently, in the positioning, the aim is to find such a vector x which best corresponds to the position of the receiver each time. On the basis of the formula (14), it is obvious that at least four measuring results, i.e. the signals of four different satellites, are required to solve the vector with four variables.

Solving the set of equations according to the formula (13), based on the delta ranges, is considerably more difficult than solving sets of equations used in methods of prior art, based on pseudo ranges. This is due, for example, to the fact that the formula (13) contains the relative velocity vector $v_i$ of the satellite, which is influenced not only by the movement of the satellite $SV_i$ but also by the movement of the positioning receiver.

In the above formula (13), a physical model is defined for the measurements of delta ranges. Assuming that the average value of the noise component $\epsilon_{\dot{\rho}i}$ is 0, the following definition is obtained for the assumed delta range vector:

$$\hat{\dot{\rho}} = \begin{bmatrix} v_1 \cdot \frac{r_1 - \hat{r}_u}{\|r_1 - \hat{r}_u\|} + \hat{d} \\ v_2 \cdot \frac{r_2 - \hat{r}_u}{\|r_2 - \hat{r}_u\|} + \hat{d} \\ \vdots \\ v_n \cdot \frac{r_n - \hat{r}_u}{\|r_n - \hat{r}_u\|} + \hat{d} \end{bmatrix} \quad (16)$$

In the definition of this assumed delta range vector, it has been assumed that the positioning receiver is at a position $\hat{r}_u$ and the frequency error is $\hat{d}$.

The aim of the positioning is thus to obtain a solution in which the value of the assumed delta range vector is equal to the true delta range vector, i.e. $\hat{\dot{\rho}} = \dot{\rho}$. To present this problem, we will further define an expression for the difference in the delta ranges $$p(\hat{x}) = \hat{\dot{\rho}} - \dot{\rho} = \begin{bmatrix} v_1 \cdot \frac{r_1 - \hat{r}_u}{\|r_1 - \hat{r}_u\|} + \hat{d} - \dot{\rho}_1 \\ v_2 \cdot \frac{r_2 - \hat{r}_u}{\|r_2 - \hat{r}_u\|} + \hat{d} - \dot{\rho}_2 \\ \vdots \\ v_n \cdot \frac{r_n - \hat{r}_u}{\|r_n - \hat{r}_u\|} + \hat{d} - \dot{\rho}_n \end{bmatrix} \quad (17)$$

This is a vector valued function with the position of the positioning receiver and the frequency error as arguments. The components of the vector function are differences between the predicted delta ranges (assuming that $x = \hat{x}$) and the measured delta ranges $\dot{\rho}$.

From the formula (13), it can be noticed that if the estimated vector $\hat{x}$ is equal to the vector x indicating the real position and frequency error, the value of the function $p(\hat{x})$ according to formula (17) must be a zero vector. In this case, the positioning problem can be presented in the form $$p(\hat{x}) = p(\hat{r}_u, \hat{d}) = \begin{bmatrix} v_1 \cdot \frac{r_1 - \hat{r}_u}{\|r_1 - \hat{r}_u\|} + \hat{d} - \dot{\rho}_1 \\ v_2 \cdot \frac{r_2 - \hat{r}_u}{\|r_2 - \hat{r}_u\|} + \hat{d} - \dot{\rho}_2 \\ \vdots \\ v_n \cdot \frac{r_n - \hat{r}_u}{\|r_n - \hat{r}_u\|} + \hat{d} - \dot{\rho}_n \end{bmatrix} = \begin{bmatrix} 0 \\ 0 \\ \vdots \\ 0 \end{bmatrix} \quad (18)$$

This is further developed to a function $f(\hat{r}_u, \hat{d}) = \|p(\hat{r}_u, \hat{d})\|^2$. In the positioning receiver, the aim is to find the minimum value of the function $f(\hat{r}_u, \hat{d})$. On the basis of this minimum value, it is possible to find out the position data of the positioning receiver. An attempt to find the minimum value of the function can be made by searching for the minimum value of one or more components $x_u$, $y_u$, $z_u$, $d$ of the vector $$x = \begin{bmatrix} r_u \\ d \end{bmatrix} = \begin{bmatrix} x_u \\ y_u \\ z_u \\ d \end{bmatrix} \in R^4.$$

However, it will be obvious that the invention is not limited solely to searching for the minimum value of said components, but also searching for the minimum values of other suitable variables can be applied in connection with the invention.

Several minimizing methods are known, of which the Gauss-Newton method is mentioned in this context and will be used in the following example in the search for the minimum point of the function $f(\hat{r}_u, \hat{d})$. Let us first approximate the function $p(\hat{x})$ of the delta range by the first order Taylor series at the estimated point of location $x_k$:

$$p(x_k + \Delta x) \approx p(x_k) + \frac{\partial p(\hat{x})}{\partial \hat{x}} \bigg|_{\hat{x} = x_k} \Delta x \quad (19)$$

in which $\Delta x$ is a vector whose norm is relatively small. Let us indicate the derivative matrix more shortly with:

$$G(x_k) \equiv \frac{\partial p(\hat{x})}{\partial \hat{x}} \bigg|_{\hat{x} = x_k}.$$

When the Gauss-Newton method is used for solving the minimum point of the function f, the following equation is obtained for the correction term used in the iteration:

$$\Delta x = -\{[G(x_k)]^T [G(x_k)]\}^{-1} [G(x_k)]^T p(x_{kk}) \quad (20)$$

Thus, to perform positioning, an initial estimate (estimated position) $x_0$ is first selected for the position. This is followed by calculating the differences in the delta ranges and the derivative matrix $G(x_k)$. At the first time, $x_k = x_0$. The correction term is calculated according to the equation (20), after which it is possible to compute new estimates for the position and for the frequency error by adding the previous estimate and the correction term: $x_{k+1} = x_k + \Delta x$. Next, the norm of the correction term is examined, and if it is lower than a set threshold value, the iteration can be terminated and the result is a relatively accurate estimate for the position of the positioning receiver and for the frequency error. If the absolute value of the correction term is not sufficiently low, the above steps following the selection of the initial estimate are iterated until a sufficiently low value for the correction term is achieved.

We shall now describe the calculation of the derivative matrix according to an advantageous embodiment. Since $$G(x_k) = \frac{\partial p(\hat{x})}{\partial \hat{x}},$$

the matrix G contains as many rows as the function $p(\hat{x})$ and as many columns as the estimate $\hat{x}$ for the position and the frequency error. Consequently, $G(\hat{x}) \in R^{n \times 4}$, in which n is the number of satellites used in the computation. The matrix G can be found relatively easily function $p(\hat{x})$. This can be performed for example in the following way:

$$G(x_k) = \frac{\partial p(\hat{x})}{\partial \hat{x}} = \frac{\partial p(\hat{x})}{\partial \begin{bmatrix} \hat{r}_u \\ \hat{d} \end{bmatrix}} = \begin{bmatrix} \frac{\partial p_1}{\partial \hat{r}_u} & \frac{\partial p_1}{\partial \hat{d}} \\ \frac{\partial p_2}{\partial \hat{r}_u} & \frac{\partial p_2}{\partial \hat{d}} \\ \vdots & \vdots \\ \frac{\partial p_n}{\partial \hat{r}_u} & \frac{\partial p_n}{\partial \hat{d}} \end{bmatrix} \in R^{n \times 4} \quad (21)$$

in which the variables $p_i$ are the components of the vector function p. On the basis of the formula (17), it is possible to find out the formula for computing one component of the vector function p:

$$p_i(\hat{x}) = v_i \cdot \frac{r_i - \hat{r}_u}{\|r_i - \hat{r}_u\|} + \hat{d} - \dot{\rho}_i \quad (22)$$

When the $i^{th}$ component of the vector function is subjected to partial derivation in relation to the estimated position $\hat{r}_u$, the result is $$\frac{\partial p_i}{\partial \hat{r}_u} = \frac{\partial}{\partial \hat{r}_u}\left[v_i \cdot \frac{r_i - \hat{r}_u}{\|r_i - \hat{r}_u\|} + \hat{d} - \dot{\rho}_i\right] \quad (23)$$

In this formula (23), the variables $v_i$, $r_i$, $\hat{d}$ and $\dot{\rho}_i$ are constant in relation to the estimated position $\hat{r}_u$ of the positioning receiver. We shall apply the expression (fg)'=f'g+fg' of the derivative of the product in the formula (23). Thus, the formula (23) is converted to the form $$\frac{\partial p_i}{\partial \hat{r}_u} = v_i \cdot (r_i - \hat{r}_u) \frac{\partial}{\partial \hat{r}_u} \frac{1}{\|r_i - \hat{r}_u\|} + \frac{v_i^T}{\|r_i - \hat{r}_u\|} \frac{\partial}{\partial \hat{r}_u}(r_i - \hat{r}_u) \quad (24)$$

$$= v_i \cdot (r_i - \hat{r}_u) \frac{1}{\|r_i - \hat{r}_u\|^2} \frac{(r_i - \hat{r}_u)^T}{\|r_i - \hat{r}_u\|} - \frac{v_i^T}{\|r_i - \hat{r}_u\|} I_{3\times 3}$$

$$= \left\{\left(\frac{v_i}{\|r_i - \hat{r}_u\|} \cdot \frac{r_i - \hat{r}_u}{\|r_i - \hat{r}_u\|}\right) \frac{r_i - \hat{r}_u}{\|r_i - \hat{r}_u\|} - \left(\frac{r_i - \hat{r}_u}{\|r_i - \hat{r}_u\|} \cdot \frac{r_i - \hat{r}_u}{\|r_i - \hat{r}_u\|}\right) \frac{v_i}{\|r_i - \hat{r}_u\|}\right\}^T$$

in which $I_{3\times 3}$ is an identity matrix. The right hand side of the equation (24) can be transformed into a geometrically more illustrative form by applying the vector triple product formula 17: $a \times (b \times c) = (a \cdot c)b - (a \cdot b)c$, in which $$a = c = \frac{r_i - \hat{r}_u}{\|r_i - \hat{r}_u\|} \text{ and } b = -\frac{v_i}{\|r_i - \hat{r}_u\|}$$

The result is the expression $$\frac{\partial p_i(\hat{x})}{\partial \hat{r}_u} = \left\{\frac{r_i - \hat{r}_u}{\|r_i - \hat{r}_u\|} \times \left(\frac{-v_i}{\|r_i - \hat{r}_u\|} \times \frac{r_i - \hat{r}_u}{\|r_i - \hat{r}_u\|}\right)\right\}^T \quad (25)$$

-continued $$= \left\{\frac{r_i - \hat{r}_u}{\|r_i - \hat{r}_u\|} \times \left(\frac{r_i - \hat{r}_u}{\|r_i - \hat{r}_u\|} \times \frac{v_i}{\|r_i - \hat{r}_u\|}\right)\right\}^T$$

The cross product of two vectors is always orthogonal to both of the vectors. Thus, the partial derivative $$\frac{\partial p_i}{\partial \hat{r}_u}$$

lies in the same plane with both the satellite relative velocity vector $v_i$ and the estimated vector $r_i - \hat{r}_u$ from the positioning receiver to the satellite. Moreover, the satellite relative velocity vector and said estimated vector are perpendicular to each other.

To complete the calculation of the matrix G, we must still determine the partial derivative of the function $p_i$ of the difference between the delta ranges with respect to the frequency error $$\hat{d}, \frac{\partial p_i(\hat{x})}{\partial \hat{d}}.$$

From the equation (22), it can be seen that $$\frac{\partial p_i(\hat{x})}{\partial \hat{d}} = 1.$$

Now, all the necessary partial derivatives have been determined, wherein by replacing them in the equation (21), the following equation is obtained for the matrix G:

$$G(\hat{x}) = \begin{bmatrix} \left\{\frac{r_1 - \hat{r}_u}{\|r_1 - \hat{r}_u\|} \times \left(\frac{r_1 - \hat{r}_u}{\|r_1 - \hat{r}_u\|} \times \frac{v_1}{\|r_1 - \hat{r}_u\|}\right)\right\}^T & 1 \\ \left\{\frac{r_2 - \hat{r}_u}{\|r_2 - \hat{r}_u\|} \times \left(\frac{r_2 - \hat{r}_u}{\|r_2 - \hat{r}_u\|} \times \frac{v_2}{\|r_2 - \hat{r}_u\|}\right)\right\}^T & 1 \\ \vdots & \vdots \\ \left\{\frac{r_n - \hat{r}_u}{\|r_n - \hat{r}_u\|} \times \left(\frac{r_n - \hat{r}_u}{\|r_n - \hat{r}_u\|} \times \frac{v_n}{\|r_n - \hat{r}_u\|}\right)\right\}^T & 1 \end{bmatrix} \quad (26)$$

Thus, in connection with the positioning, the matrix G can be advantageously solved by the formula (26).

The above-presented positioning method can be applied in positioning receivers, for example in the positioning receiver 2 shown in FIG. 1. In this example, the positioning receiver 2 is implemented in connection with an electronic device 1, such as a wireless communication device, but it will be obvious that the invention is not limited solely to this embodiment. The positioning receiver 2 according to the invention can also be applied, within the scope of the present invention, as a separate electronic device without being connected to another device.

A majority of the steps of the method according to the invention can be implemented by software, as program commands in the processor, such as a digital signal processor (DSP), in the control block 11. For the positioning computing, the delta ranges must be measured to at least four different satellites $SV_i$. The positioning receiver 2 preferably comprises at least four receiving channels, wherein it is possible to receive the signals of four satellites simultaneously. In FIG. 1, the block chart of the positioning receiver 2 shows, for clarity, the structure of only one such receiving channel, the other receiving channels being preferably substantially identical. The repetition-coded signal to be received via an antenna 3 is amplified in a high-frequency amplifier 4 and converted by means of a clock signal generated by a clock generator 5 and a frequency synthesizer 6 preferably to an intermediate frequency or directly to a baseband in a converter block 7. At this stage, the signal is preferably still in analog format, wherein it is converted to a digital signal in an analog-to-digital converter 8. The analog-to-digital converter 8 provides not only a digital receiving signal but also a control to an automatic gain control (AGC) block 9 to level out variations in strength of the received signal in a way known as such. The digital signal converted to an intermediate frequency or to the base-band is led to a digital monitoring block 10, to find out the carrier frequency of the received signal. As the difference between these carrier frequencies determined in the different blocks and the known transmission frequency, the delta range measurements for the different satellites are obtained, to be used in the above-described equation to be minimized. Some of the above-mentioned blocks of the receiving channel may be common to all the receiving channels, such as the antenna 3 and the high-frequency amplifier 4.

Figure 2:
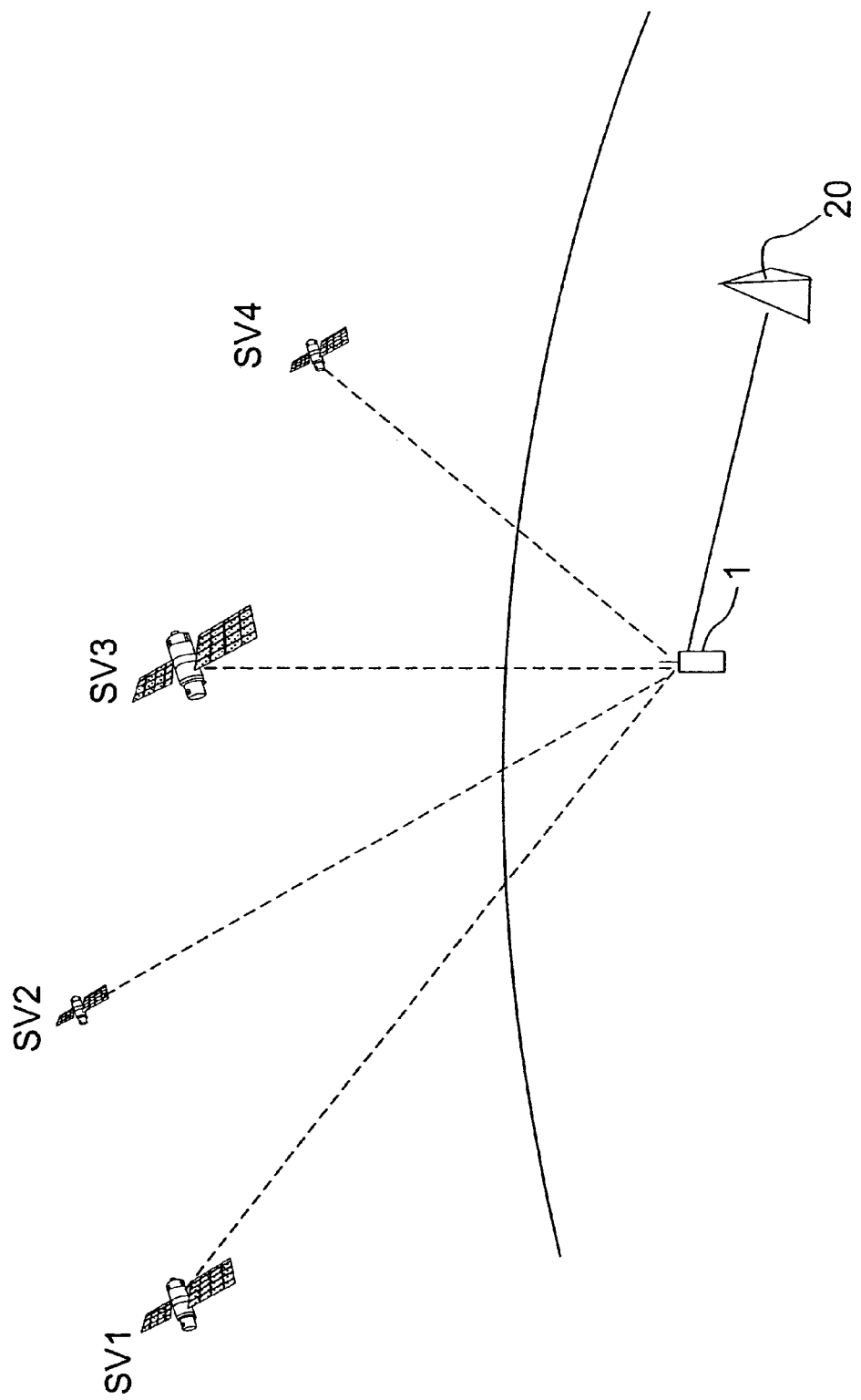
FIG. 2 shows, in a reduced view, a positioning system, in which the invention can be applied.

To execute the minimization, the positioning receiver 2 must also be supplied with satellite Ephemeris data and time data, if these data are not already available in the positioning receiver 2 or if they are not up to date. The data can be transmitted, for example, from a base station 20 of a mobile communication network (FIG. 2), if necessary. If the positioning receiver 2 has sufficiently up-to-date Ephemeris data, the only data to be transmitted to the positioning data when starting the positioning is the time data of the satellite system. The Ephemeris data and the time data can be received, for example, by a second antenna 13, from which the signals are led to mobile communication means 12 for processing in a way known as such. Preferably, the data are also stored in memory means 14. Of the Ephemeris data, the data of those satellites are retrieved, whose signal carrier is processed in the receiving channels of the positioning receiver. The time data is used as time data common to all the receiving channels. On the basis of the Ephemeris data, it is possible in the positioning receiver to determine the position of the satellites at a given moment of time. The satellite position data can be utilized to compute the velocity $v_i$ of the satellites in relation to the receiver. The position, velocity and time of the satellites are placed in the set of equations to be minimized, after which the positioning computing can be started preferably in the control block 11.

By the method of the invention, it is possible to achieve an accuracy in the order of 100 m for the position of the positioning receiver 2. To achieve this, it is sufficient that the positioning data used as the initial estimate is correct at an accuracy of some thousands of kilometres, which means in practice that the method can be used to determine the position of the positioning receiver at said accuracy at a very high probability. The positioning data obtained by the method can be used, if necessary, as an initial value for the position in another positioning method, if more accurate position data is yet to be obtained.

The electronic device 1 of FIG. 1 further comprises, for example, a display 15, a keypad 16 and audio means 17, 18, 19, but it will be obvious that in practical applications, the structure of the electronic device 1 may differ from that shown in FIG. 1. Furthermore, the positioning functions include various acquisition and tracking functions which need not be discussed in more detail in this context.

It is obvious that the present invention is not limited solely to the embodiments presented herein, but it can be modified within the scope of the appended claims.

The invention claimed is:

1. A method for positioning an electronic device in which a code modulated signal transmitted by satellites, position information of the satellites and time data are received, and local time data is generated, wherein delta range measurements are taken for at least four different satellites, said delta range measurements each providing a value of a rate of change of a delta range with respect to time, wherein for each delta range measurement the satellite velocity is determined in relation to the electronic device, wherein said delta range measurements and velocities are used for generating reference data to determine the frequency error of the local time data and the position of the electronic device, and the minimum value of said reference data is searched.

2. The method according to claim 1, using an algorithm as said reference data, replacing the delta range measurement results in said algorithm, and finding the minimum value for said algorithm.

3. The method according to claim 2, wherein said algorithm used is the function $f(p(\hat{r}_u, \hat{d}))$, in which $$p(\hat{r}_u, \hat{d}) = \begin{bmatrix} v_1 \cdot \dfrac{r_1 - \hat{r}_u}{\|r_1 - \hat{r}_u\|} + \hat{d} - \dot{\rho}_1 \\ v_2 \cdot \dfrac{r_2 - \hat{r}_u}{\|r_2 - \hat{r}_u\|} + \hat{d} - \dot{\rho}_2 \\ \vdots \\ v_n \cdot \dfrac{r_n - \hat{r}_u}{\|r_n - \hat{r}_u\|} + \hat{d} - \dot{\rho}_n \end{bmatrix},$$

$v_i$, i=1 . . . n are said velocity vectors of the satellites in relation to the electronic device,
$r_i$, i=1 . . . n are the position vectors of the satellites,
$\dot{\rho}_i$, i=1 . . . n are the delta range measurements,
$\hat{r}_u$ is the estimated position vector of the electronic device,
$\hat{d}$ is the effect of the estimated frequency error of the electronic device on the delta range measurements, and
$n \geq 4$,
wherein in the search for the minimum value, $\hat{r}_u$ and $\hat{d}$ are determined.

4. The method according to claim 2, wherein said algorithm used is the function $f(\hat{r}_u, \hat{d}) = \|p(\hat{r}_u, \hat{d})\|^m$, in which $$p(\hat{r}_u, \hat{d}) = \begin{bmatrix} v_1 \cdot \dfrac{r_1 - \hat{r}_u}{\|r_1 - \hat{r}_u\|} + \hat{d} - \dot{\rho}_1 \\ v_2 \cdot \dfrac{r_2 - \hat{r}_u}{\|r_2 - \hat{r}_u\|} + \hat{d} - \dot{\rho}_2 \\ \vdots \\ v_n \cdot \dfrac{r_n - \hat{r}_u}{\|r_n - \hat{r}_u\|} + \hat{d} - \dot{\rho}_n \end{bmatrix},$$

$v_i$, i=1 . . . n are said velocity vectors of the satellites in relation to the electronic device,
$r_i$, i=1 . . . n are the position vectors of the satellites,
$\dot{\rho}_i$, i=1 . . . n are the delta range measurements, $\hat{r}_u$ is the estimated position vector of the electronic device, $\hat{d}$ is the effect of the estimated frequency error of the electronic device (1) on the delta range measurements, m∈R, and n≧4, wherein in the search for the minimum value, $\hat{r}_u$, and $\hat{d}$ are determined.

5. The method according to claim 4, wherein m=2.

6. The method according to claim 3, wherein for the search of the minimum value, the matrix $$G(\hat{x}) = \begin{bmatrix} \left\{ \frac{r_1 - \hat{r}_u}{\|r_1 - \hat{r}_u\|} \times \left( \frac{r_1 - \hat{r}_u}{\|r_1 - \hat{r}_u\|} \times \frac{v_1}{\|r_1 - \hat{r}_u\|} \right) \right\}^T & 1 \\ \left\{ \frac{r_2 - \hat{r}_u}{\|r_2 - \hat{r}_u\|} \times \left( \frac{r_2 - \hat{r}_u}{\|r_2 - \hat{r}_u\|} \times \frac{v_2}{\|r_2 - \hat{r}_u\|} \right) \right\}^T & 1 \\ \vdots & \vdots \\ \left\{ \frac{r_n - \hat{r}_u}{\|r_n - \hat{r}_u\|} \times \left( \frac{r_n - \hat{r}_u}{\|r_n - \hat{r}_u\|} \times \frac{v_n}{\|r_n - \hat{r}_u\|} \right) \right\}^T & 1 \end{bmatrix}$$

is solved.

7. The method according to the claim 1, wherein for the search of the minimum value of the reference value, the minimum value of one or more components of the vector $$x = \begin{bmatrix} r_u \\ d \end{bmatrix} = \begin{bmatrix} x_u \\ y_u \\ z_u \\ d \end{bmatrix} \in R^4$$

is searched.

8. The method according to the claim 1, wherein it is assumed that the electronic device is stationary, wherein the velocity vectors of the satellites are used as the velocity vectors.

9. A system comprising receiving means for receiving code modulated signals transmitted by satellites, means for receiving position information of the satellites and time data, and means for generating local time data, wherein the system further comprises means for taking delta range measurements for at least four different satellites wherein said delta range measurements each provide a value of a rate of change of a delta range with respect to time, means for determining the velocity of each of said at least four satellites in relation to the receiving means, means for using said delta range measurements and velocities for generating reference data to determine the frequency error of the local time data and position, and means for searching for the minimum value of said reference data.

10. The system according to claim 9, wherein an algorithm is arranged to be used as said reference data, that the delta range measurement results are arranged to be placed in said algorithm, and that the means for searching for the minimum value of said reference data comprise means for searching for the minimum value of said algorithm.

11. The system according to claim 10, wherein said algorithm is the function $f(p(\hat{r}_u,\hat{d}))$, in which $$p(\hat{r}_u, \hat{d}) = \begin{bmatrix} v_1 \cdot \frac{r_1 - \hat{r}_u}{\|r_1 - \hat{r}_u\|} + \hat{d} - \dot{\rho}_1 \\ v_2 \cdot \frac{r_2 - \hat{r}_u}{\|r_2 - \hat{r}_u\|} + \hat{d} - \dot{\rho}_2 \\ \vdots \\ v_n \cdot \frac{r_n - \hat{r}_u}{\|r_n - \hat{r}_u\|} + \hat{d} - \dot{\rho}_n \end{bmatrix},$$

$v_i$, i=1 . . . n are said velocities of the satellites, $r_i$, i=1 . . . n are the position data of the satellites, $\dot{\rho}_i$, i=1 . . . n are the delta range measurements, $\hat{r}_u$ is the position vector of the receiving means, and $\hat{d}$ is the effect of the frequency error of the receiving means on the delta range measurements, and n≧4.

12. The system according to claim 10, wherein said algorithm is the function $f(\hat{r}_u,\hat{d})=\|p(\hat{r}_u, \hat{d})\|^m$, in which $$p(\hat{r}_u, \hat{d}) = \begin{bmatrix} v_1 \cdot \frac{r_1 - \hat{r}_u}{\|r_1 - \hat{r}_u\|} + \hat{d} - \dot{\rho}_1 \\ v_2 \cdot \frac{r_2 - \hat{r}_u}{\|r_2 - \hat{r}_u\|} + \hat{d} - \dot{\rho}_2 \\ \vdots \\ v_n \cdot \frac{r_n - \hat{r}_u}{\|r_n - \hat{r}_u\|} + \hat{d} - \dot{\rho}_n \end{bmatrix},$$

$v_i$, i=1 . . . n are said velocities of the satellites, $r_i$, i=1 . . . n are the position data of the satellites, $\dot{\rho}_i$, i=1 . . . n are the delta range measurements, $\hat{r}_u$ is the position vector of the positioning receiver, and $\hat{d}$ is the effect of the time frequency error of the positioning receiver on the delta range measurements, and n≧4.

13. The system according to claim 12, wherein m=2.

14. The system according to claim 11, wherein the means for searching for the minimum value of the algorithm comprise means for solving the matrix $$G(\hat{x}) = \begin{bmatrix} \left\{ \frac{r_1 - \hat{r}_u}{\|r_1 - \hat{r}_u\|} \times \left( \frac{r_1 - \hat{r}_u}{\|r_1 - \hat{r}_u\|} \times \frac{v_1}{\|r_1 - \hat{r}_u\|} \right) \right\}^T & 1 \\ \left\{ \frac{r_2 - \hat{r}_u}{\|r_2 - \hat{r}_u\|} \times \left( \frac{r_2 - \hat{r}_u}{\|r_2 - \hat{r}_u\|} \times \frac{v_2}{\|r_2 - \hat{r}_u\|} \right) \right\}^T & 1 \\ \vdots & \vdots \\ \left\{ \frac{r_n - \hat{r}_u}{\|r_n - \hat{r}_u\|} \times \left( \frac{r_n - \hat{r}_u}{\|r_n - \hat{r}_u\|} \times \frac{v_n}{\|r_n - \hat{r}_u\|} \right) \right\}^T & 1 \end{bmatrix}.$$

15. An electronic device comprising means for receiving code modulated signals transmitted by satellites, means for receiving position information of the satellites and time data, and means for generating local time data, wherein the electronic device further comprises means for taking delta range measurements for at least four different satellites wherein said delta range measurements each provide a value of a rate of change of a delta range with respect to time, means for determining the velocities of each of said at least four satellites in relation to the electronic device, means for using said delta range measurements and velocities to generate reference data for determining the frequency error of the local time data and position, and means for searching for the minimum value of said reference data.

16. The electronic device according to claim 15, wherein an algorithm is arranged to be used as said reference data, that the delta range measurement results are arranged to be replaced in said algorithm, and that the means for searching for the minimum value of said reference data comprise means for searching for the minimum value of said algorithm.

17. The electronic device according to claim 16, wherein said algorithm is the function $f(p(\hat{r}_u, \hat{d}))$, in which $$p(\hat{r}_u, \hat{d}) = \begin{bmatrix} v_1 \cdot \frac{r_1 - \hat{r}_u}{\|r_1 - \hat{r}_u\|} + \hat{d} - \dot{p}_1 \\ v_2 \cdot \frac{r_2 - \hat{r}_u}{\|r_2 - \hat{r}_u\|} + \hat{d} - \dot{p}_2 \\ \vdots \\ v_n \cdot \frac{r_n - \hat{r}_u}{\|r_n - \hat{r}_u\|} + \hat{d} - \dot{p}_n \end{bmatrix},$$

$v_i$, i=1 . . . n are said velocities of the satellites,
$r_i$, i=1 . . . n are the position of the satellites,
$\dot{p}_i$, i=1 . . . n are the delta range measurements, $\hat{r}_u$ is the position vector of the electronic device, and
$\hat{d}$ is the effect of the frequency error of the electronic device on the delta range measurements, and
$n \geq 4$.

18. The electronic device according to claim 15, wherein it is a positioning receiver.

19. The electronic device according to claim 15, wherein it is a wireless communication device.

* * * * *